United States Patent
Abe

(10) Patent No.: US 11,040,640 B2
(45) Date of Patent: Jun. 22, 2021

(54) VEHICLE SEAT LIFTING APPARATUS

(71) Applicant: SHIROKI CORPORATION, Fujisawa (JP)

(72) Inventor: Yuki Abe, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 16/794,788

(22) Filed: Feb. 19, 2020

(65) Prior Publication Data

US 2020/0262319 A1 Aug. 20, 2020

(30) Foreign Application Priority Data

Feb. 20, 2019 (JP) .............................. JP2019-028471

(51) Int. Cl.
B60N 2/16 (2006.01)

(52) U.S. Cl.
CPC ............. B60N 2/168 (2013.01); B60N 2/165 (2013.01); B60N 2/1615 (2013.01); B60N 2/1695 (2013.01)

(58) Field of Classification Search
CPC ...... B60N 2/1615; B60N 2/165; B60N 2/168; B60N 2/1695; B60N 2002/0236
See application file for complete search history.

(56) References Cited

U.S. PATENT DOCUMENTS

| | | | | |
|---|---|---|---|---|
| 4,121,802 A | * | 10/1978 | Kluting | B60N 2/1615 248/421 |
| 4,556,185 A | * | 12/1985 | Takagi | B60N 2/045 248/421 |
| 4,767,156 A | * | 8/1988 | Yamada | B60N 2/1615 248/394 |
| 4,787,594 A | * | 11/1988 | Ikegaya | B60N 2/0232 248/421 |
| 5,882,061 A | * | 3/1999 | Guillouet | B60N 2/1615 248/421 |
| 6,264,275 B1 | * | 7/2001 | Frohnhaus | B60N 2/1615 297/344.12 |
| 6,276,650 B1 | * | 8/2001 | Kojima | B60N 2/071 248/421 |
| 6,464,193 B1 | * | 10/2002 | Nemoto | B60N 2/1615 248/396 |
| 6,505,888 B1 | * | 1/2003 | Teufel | B60N 2/4221 297/216.1 |

(Continued)

FOREIGN PATENT DOCUMENTS

JP 2017105408 A 6/2017

OTHER PUBLICATIONS

Machine Translation of JP 2017-105408A (Year: 2021).*

*Primary Examiner* — James M Ference
(74) *Attorney, Agent, or Firm* — Buchanan Ingersoll & Rooney PC

(57) ABSTRACT

A vehicle seat lifting apparatus includes: a cushion base of a vehicle seat; a link member rotatably provided on the cushion base and raising and lowering at least a part of the vehicle seat; a front limiter provided on a front portion in front of a rotation center of the link member and limiting rotation of the link member; and a rear limiter provided on a rear portion behind the rotation center of the link member and limiting the rotation of the link member.

3 Claims, 4 Drawing Sheets

(56) References Cited

U.S. PATENT DOCUMENTS

| | | | |
|---|---|---|---|
| 6,533,351 B2 * | 3/2003 | Deptolla | B60N 2/4221 297/216.1 |
| 6,572,065 B2 * | 6/2003 | Koga | B60N 2/067 248/421 |
| 6,749,169 B2 * | 6/2004 | Becker | B60N 2/1615 248/421 |
| 6,902,234 B2 * | 6/2005 | Becker | B60N 2/0715 248/421 |
| 7,066,540 B2 * | 6/2006 | Minai | B60N 2/1615 248/421 |
| 7,077,471 B2 * | 7/2006 | Schumann | B60N 2/1685 296/68.1 |
| 7,278,686 B2 * | 10/2007 | Yoshida | B60N 2/1615 248/421 |
| 7,316,454 B2 * | 1/2008 | Yoshida | B60N 2/1615 297/344.14 |
| 7,338,118 B2 * | 3/2008 | Ichikawa | B60N 2/071 297/216.1 |
| 7,766,427 B2 * | 8/2010 | Kojima | B60N 2/06 297/344.15 |
| 7,914,061 B2 * | 3/2011 | Jeong | B60N 2/305 296/65.05 |
| 7,984,950 B2 * | 7/2011 | Hoshi | B60N 2/1675 297/344.12 |
| 8,038,210 B2 * | 10/2011 | Telesco | B60N 2/4221 297/216.19 |
| 8,128,147 B1 * | 3/2012 | Kanda | B60N 2/1615 296/65.05 |
| 8,276,868 B2 * | 10/2012 | Chang | A47C 9/002 248/419 |
| 8,414,055 B2 * | 4/2013 | Kanda | B60N 2/1615 296/65.09 |
| 8,585,148 B2 * | 11/2013 | Yamada | B60N 2/167 297/344.15 |
| 8,807,507 B2 * | 8/2014 | Ito | B60N 2/169 248/421 |
| 9,073,456 B2 * | 7/2015 | Hoshi | B60N 2/16 |
| 9,855,870 B2 * | 1/2018 | Suzuki | B60N 2/168 |
| 2006/0061176 A1 * | 3/2006 | Sakai | B60R 22/26 297/344.15 |
| 2007/0194613 A1 * | 8/2007 | Kojima | B60N 2/0705 297/344.15 |
| 2008/0007104 A1 * | 1/2008 | Yokota | B60N 2/1615 297/344.15 |
| 2009/0152433 A1 * | 6/2009 | Choi | B60N 2/164 248/421 |
| 2009/0206643 A1 * | 8/2009 | Yamamoto | B60N 2/0232 297/313 |
| 2010/0148532 A1 * | 6/2010 | Jungert | B60N 2/1615 296/65.18 |
| 2010/0253110 A1 * | 10/2010 | Yamada | B60N 2/62 296/65.08 |
| 2010/0314927 A1 * | 12/2010 | McCulloch | B60N 2/1839 297/313 |
| 2012/0074743 A1 * | 3/2012 | Asakura | B60N 2/4228 297/216.1 |
| 2012/0212014 A1 * | 8/2012 | Arata | B60N 2/1615 297/216.1 |
| 2012/0212015 A1 * | 8/2012 | Ozawa | B60N 2/165 297/216.1 |
| 2013/0161989 A1 * | 6/2013 | Ito | B60N 2/1615 297/313 |
| 2013/0200677 A1 * | 8/2013 | Hoshi | B60N 2/682 297/344.15 |
| 2016/0114703 A1 * | 4/2016 | Fujita | B60N 2/0825 297/344.1 |
| 2017/0334314 A1 * | 11/2017 | Takada | B60N 2/1635 |
| 2020/0262319 A1 * | 8/2020 | Abe | B60N 2/1615 |

\* cited by examiner

VEHICLE SEAT LIFTING APPARATUS

CROSS-REFERENCE TO RELATED APPLICATION

This application claims priority from Japanese Patent Application No. 2019-028471 filed with the Japan Patent Office on Feb. 20, 2019, the entire content of which is hereby incorporated by reference

BACKGROUND

1. Technical Field

One aspect of the present disclosure relates to a vehicle seat lifting apparatus.

2. Related Art

As an example of the vehicle seat lifting apparatus for tilting a seat cushion of a vehicle seat, a technique of a tilting apparatus described in JP-A-2017-105408 is known.

The tilting apparatus (in JP-A-2017-105408, a front cushion lifting mechanism) moves a front portion of the seat up and down. The tilting apparatus includes a lift frame, a link member, and a connection link connecting the link member and the lift frame. The link member is rotatably attached to a base. A front portion of the link member is connected to the lift frame through the connection link. When the front portion of the link member moves up and down, the lift frame moves up and down. A gear meshing with a drive gear is provided at a rear end of the link member. An elongated hole for limiting rotation of the link member is provided behind a rotation center of the link member. A pin provided on the base is inserted into the elongated hole.

SUMMARY

A vehicle seat lifting apparatus includes: a cushion base of a vehicle seat; a link member rotatably provided on the cushion base and raising and lowering at least a part of the vehicle seat; a front limiter provided on a front portion in front of a rotation center of the link member and limiting rotation of the link member; and a rear limiter provided on a rear portion behind the rotation center of the link member and limiting the rotation of the link member.

DETAILED DESCRIPTION

Figure 1:
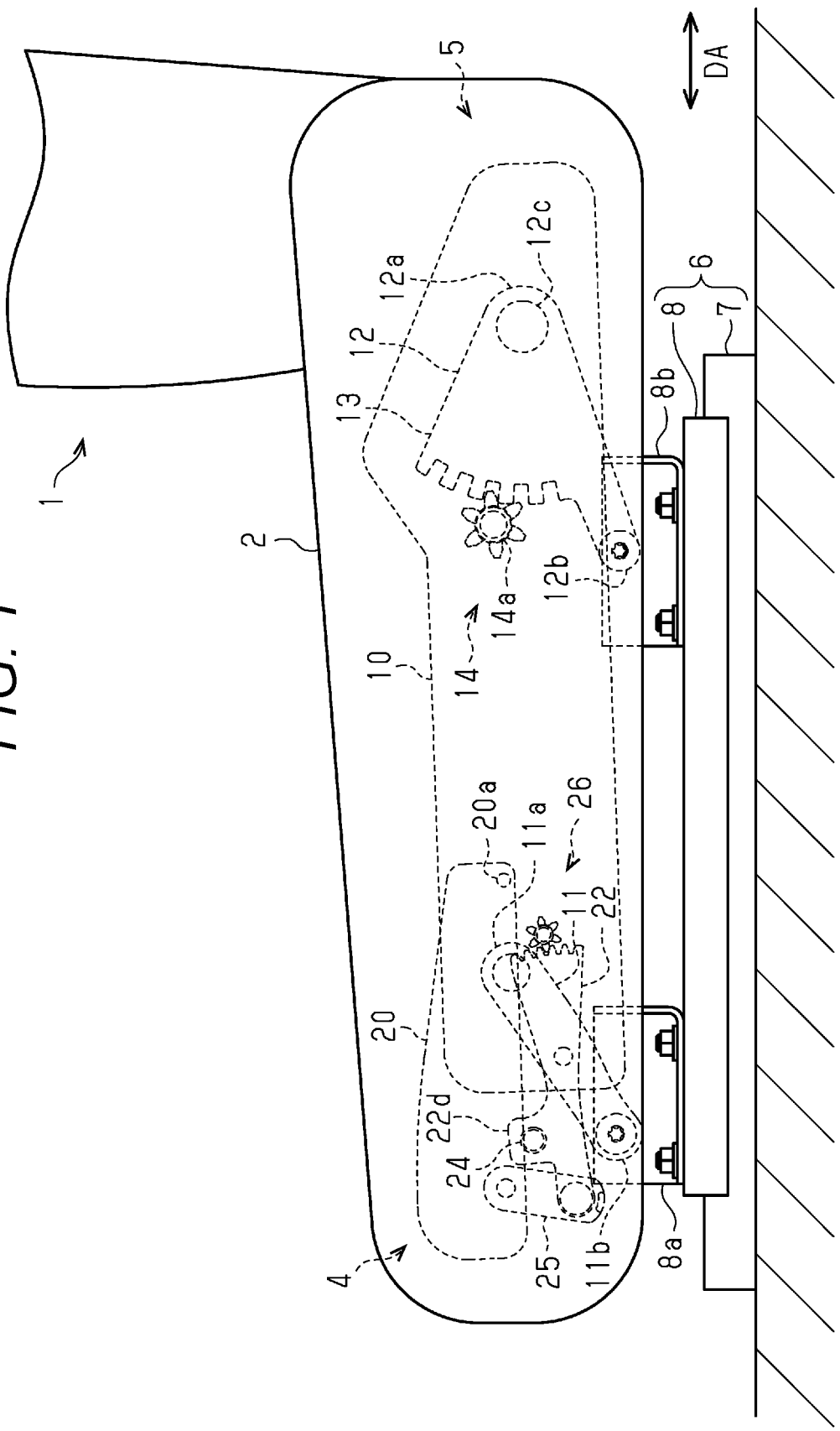
FIG. 1 is a side view of a vehicle seat.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When a strong force is applied to a tilting apparatus due to a vehicle collision, the link member or its peripheral members may be deformed. If a rear portion of the link member is deformed due to the vehicle collision, engagement between an elongated hole and a pin may be released. When means for limiting rotation of the link member does not function due to such a situation, the link member can be rotated beyond a predetermined range, and a front portion of the link member is raised (or is lowered) greatly. At the same time, there is a possibility that a lift frame may jump up (or a front portion of the lift frame may fall).

Therefore, an object of the present disclosure is to provide a vehicle seat lifting apparatus capable of suppressing rotation limit of a vehicle seat from being removed.

(1) A vehicle seat lifting apparatus (the vehicle seat lifting apparatus) according to an aspect of the present disclosure includes: a cushion base of a vehicle seat; a link member rotatably provided on the cushion base and raising and lowering at least a part of the vehicle seat; a front limiter provided on a front portion in front of a rotation center of the link member and limiting rotation of the link member; and a rear limiter provided on a rear portion behind the rotation center of the link member and limiting the rotation of the link member.

According to the vehicle seat lifting apparatus, the rotation of the link member is limited by the front limiter and the rear limiter. Thus, when two limiters are provided, it is possible to suppress the rotation limit of the link member from being completely removed. In this way, it is possible to suppress the rotation limit of the vehicle seat from being removed upon the vehicle collision or the like.

(2) The vehicle seat lifting apparatus may further include a connecting member rotatably connected to the link member. The front limiter may limit a rotation angle of the connecting member with respect to the link member. With this configuration, the rotation of the link member is limited by limiting rotation of the connecting member with respect to the link member.

(3) In The vehicle seat lifting apparatus, the front limiter may include a first contact portion provided on at least one of the connecting member and the link member, and when the link member is rotated to a predetermined angle in a direction in which the front portion of the link member is raised, the connecting member and the link member may contact each other through the first contact portion. With this configuration, a structure of the first contact portion of the front limiter can be simplified.

(4) In the vehicle seat lifting apparatus, the front limiter may include a second contact portion provided on at least one of the connecting member and the link member, and when the link member is rotated to a predetermined angle in a direction in which the front portion of the link member is lowered, the connecting member and the link member may contact each other through the second contact portion. With this configuration, a structure of the second contact portion of the front limiter can be simplified.

(5) In the vehicle seat lifting apparatus, a plurality of the link members may be arranged apart from each other in a vehicle width direction and be connected to each other with a connecting shaft, and the second contact portion may be constituted by the connecting shaft. With this configuration, since the connecting shaft has a function of the second contact portion, a structure of the vehicle seat lifting apparatus can be simplified.

With the vehicle seat lifting apparatus, it is possible to suppress the rotation limit of the vehicle seat from being removed.

The tilting apparatus as an example of the vehicle seat lifting apparatus will be described with reference to FIGS. 1 to 6.

A tilting apparatus 4 is provided in a vehicle seat 1. The tilting apparatus 4 may be provided in the vehicle seat 1 together with a seat lifting apparatus 5 that moves the vehicle seat up and down. Further, the tilting apparatus 4 may be provided in the vehicle seat 1 together with a seat sliding apparatus 6. The vehicle seat 1 shown in the present embodiment is provided with the seat sliding apparatus 6, the seat lifting apparatus 5, and the tilting apparatus 4.

FIG. 1 shows a side view of the vehicle seat 1. The seat sliding apparatus 6 includes a pair of lower rails 7 and upper rails 8 that move along the lower rails 7. The upper rails 8 are respectively arranged on the pair of lower rails 7. The pair of lower rails 7 is arranged in the vehicle width direction. Each of the pair of lower rails 7 is arranged so that a longitudinal direction of the lower rail 7 is along a vehicle front-rear direction DA. The upper rail 8 is moved manually or electrically with respect to the lower rail 7.

The seat lifting apparatus 5 includes a cushion base 10, a front link 11, a rear link 12, and a drive mechanism 14. The cushion base 10 is fixed to a frame of a seat cushion 2. The cushion base 10 is arranged so that its longitudinal direction is along the vehicle front-rear direction DA.

As shown in FIG. 1, an upper portion 11a of the front link 11 is rotatably connected to a front portion of the cushion base 10. A lower portion 11b of the front link 11 is rotatably connected to a front bracket 8a of the upper rail 8. An upper portion 12a of the rear link 12 is rotatably connected to a rear portion of the cushion base 10. A lower portion 12b of the rear link 12 is rotatably connected to a rear bracket 8b of the upper rail 8. A sector gear 13 is provided in an upper portion of the rear link 12. In the rear link 12, the sector gear 13 is provided in front of a rotation shaft 12c of the upper portion 12a of the rear link 12.

The drive mechanism 14 includes a drive gear 14a. The drive gear 14a is rotated by power of an electric motor. The drive gear 14a meshes with the sector gear 13 of the rear link 12. When the drive gear 14a is rotated in a first direction in the side view shown in FIG. 1, the upper portion 12a of the rear link 12 and the upper portion 11a of the front link 11 move obliquely rearward and downward. Thus, the cushion base 10 moves downward. When the drive gear 14a is rotated in an opposite direction to the first direction in the side view shown in FIG. 1, the upper portion 12a of the rear link 12 and the upper portion 11a of the front link 11 move obliquely forward and upward. Thus, the cushion base 10 moves upward.

The tilting apparatus 4 includes at least the cushion base 10 of the vehicle seat 1 and a link member 22. In the present embodiment, the cushion base 10 is a component of the seat lifting apparatus 5 and also a component of the tilting apparatus 4. The link member 22 is rotatably provided on the cushion base 10 and raises and lowers at least a part of the vehicle seat 1. In the present embodiment, the tilting apparatus 4 includes the cushion base 10, the link member 22, a connecting member 25 connected to a lift frame 20 of the vehicle seat 1, and a drive mechanism 26. The tilting apparatus 4 tilts a front portion of the seat cushion 2 of the vehicle seat 1.

The lift frame 20 of the vehicle seat 1 is a component for moving the front portion of the cushion base 10 up and down. The lift frame 20 is rotatably provided on the front portion of the cushion base 10. The lift frame 20 is preferably provided on each of left and right sides of the cushion base 10. A rear portion of the lift frame 20 is rotatably connected to the cushion base 10 through a first rotation shaft 20a.

Figure 2:
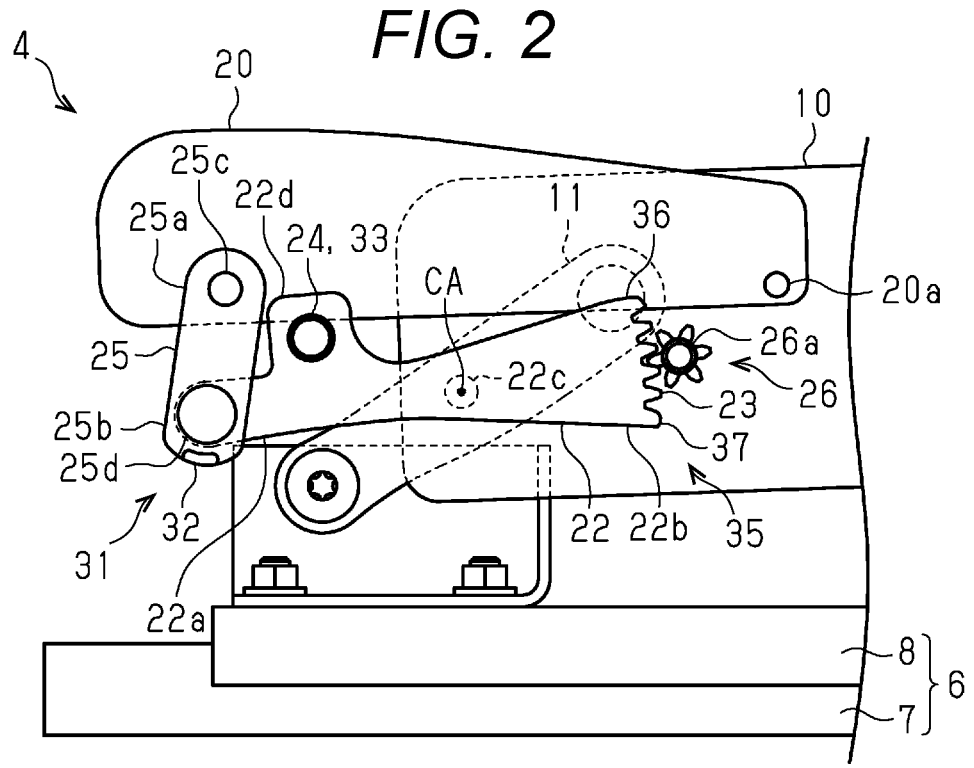
FIG. 2 is a side view of a tilting apparatus when a front portion of a lift frame is located at a reference position.

As shown in FIG. 2, the link member 22 is disposed below the lift frame 20. In the present embodiment, the link member 22 is provided on each of the left and right sides of the cushion base 10. Two link members 22 are arranged apart from each other in the vehicle width direction and are connected to each other with a connecting shaft 24. An intermediate portion (not shown) of the connecting shaft 24 in the vehicle width direction passes through a space where it does not interfere with the cushion base 10 and the lift frame 20 in a rotation range of the link member 22. An end of the connecting shaft 24 is positioned such that a front end of the connecting shaft 24 contacts the connecting member 25 when the link member 22 is disposed at a predetermined angle with respect to the cushion base 10 (See FIG. 6). The link member 22 has a connecting portion 22d to which the connecting shaft 24 is connected. The connecting portion 22d is provided at a front portion 22a in front of a rotation center CA of the link member 22, and protrudes upward.

The link member 22 is rotatably provided on the cushion base 10. The link member 22 is rotated by the power of the drive mechanism 26 including the electric motor. An intermediate portion of the link member 22 is rotatably connected to the cushion base 10 through a second rotation shaft 22c.

The front portion 22a in front of the rotation center CA of the link member 22 is connected to a front portion of the lift frame 20 through the connecting member 25. The front portion 22a in front of the rotation center CA of the link member 22 is provided with a front limiter 31 for limiting the rotation of the link member 22. A rear portion 22b behind the rotation center CA of the link member 22 is provided with a rear limiter 35 for limiting the rotation of the link member 22. The rear portion 22b of the link member 22 is provided with a sector gear 23 that meshes with a drive gear 26a. A tooth surface of the sector gear 23 faces rearward.

The connecting member 25 connects the lift frame 20 and the link member 22. When the link members 22 are provided on the left and right sides of the cushion base 10, the connecting member 25 is provided for each of the two link members 22. An upper portion 25a of the connecting member 25 is rotatably connected to the front portion of the lift frame 20 through a third rotation shaft 25c. A lower portion 25b of the connecting member 25 is rotatably connected to the front portion 22a of the link member 22 through a fourth rotation shaft 25d.

The drive mechanism 26 includes the drive gear 26a The drive gear 26a is rotated with the power of the electric motor. When the drive gear 26a is rotated counterclockwise in the side view shown in FIG. 2, the front portion 22a of the link member 22 is rotated to rise. Thus, the front portion of the lift frame 20 is raised. When the drive gear 26a is rotated clockwise in the side view shown in FIG. 2, the front portion 22a of the link member 22 is lowered. Thus, the front portion of the lift frame 20 is lowered.

The drive mechanism 14 of the seat lifting apparatus 5 and the drive mechanism 26 of the tilting apparatus 4 are controlled to work together. For example, in control of lowering a sitting height of the vehicle seat 1 at the time of the vehicle collision in order to prevent a head of a user from colliding with a vehicle ceiling at the time of the vehicle collision, the drive mechanism 14 of the seat lifting apparatus 5 and the drive mechanism 26 of the tilting apparatus 4 work together. In another example, the drive mechanism 14 of the seat lifting apparatus 5 and the drive mechanism 26 of the tilting apparatus 4 are controlled independently. For example, when position and inclination of the seat cushion 2 are adjusted to the user's preference, the drive mechanism 14 of the seat lifting apparatus 5 and the drive mechanism 26 of the tilting apparatus 4 are independently controlled by the user's operation.

The front limiter 31 limits a range of rotation angle of the link member 22 with respect to the cushion base 10. In the present embodiment, the front limiter 31 limits the range of the rotation angle of the link member 22 with respect to the cushion base 10 by limiting the rotation angle of the connecting member 25 with respect to the link member 22. The front limiter 31 includes a first contact portion 32. The first contact portion 32 is provided on at least one of the connecting member 25 and the link member 22. In the present embodiment, the first contact portion 32 is provided at a lower end of the connecting member 25. The lower end of the connecting member 25 is disposed below a lower end of the front portion 22a of the link member 22. When the link member 22 is rotated to a predetermined angle in the direction in which the front portion 22a of the link member 22 is raised, the connecting member 25 and the link member 22 contact each other through the first contact portion 32.

The front limiter 31 preferably includes a second contact portion 33. The second contact portion 33 is provided on at least one of the connecting member 25 and the link member 22. In the present embodiment, the second contact portion 33 is provided on the link member 22. Specifically, the second contact portion 33 is constituted by the connecting shaft 24. When the link member 22 is rotated to a predetermined angle in a direction in which the front portion 22a of the link member 22 is lowered, the connecting member 25 and the link member 22 contact each other through the second contact portion 33.

The rear limiter 35 limits the range of the rotation angle of the link member 22 with respect to the cushion base 10. In the present embodiment, a limited range of the rotation angle of the rear limiter 35 is within a limited range of the rotation angle of the front limiter 31. In this case, when the rotation limit of the link member 22 by the rear limiter 35 is removed by deformation of the link member 22 due to the vehicle collision, the rotation of the link member 22 is limited by the front limiter 31. In another example, the limited range of the rotation angle of the front limiter 31 is within the limited range of the rotation angle of the rear limiter 35. In this case, when the rotation limit of the link member 22 by the front limiter 31 is removed by the deformation of the link member 22 due to the vehicle collision, the rotation of the link member 22 is limited by the rear limiter 35.

The rear limiter 35 is configured as, for example, stoppers provided at both ends of the sector gear 23. The stopper stops the rotation of the drive gear 26a by applying a load larger than the load applied to the drive gear 26a to the drive gear 26a when the drive gear 26a and the sector gear 23 mesh with each other. A height of the stopper is higher than a height (total tooth height) of tooth of the sector gear 23. In the present embodiment, an upper stopper 36 is provided in an upper portion of the sector gear 23. A lower stopper 37 is provided in a lower portion of the sector gear 23.

Figure 3:
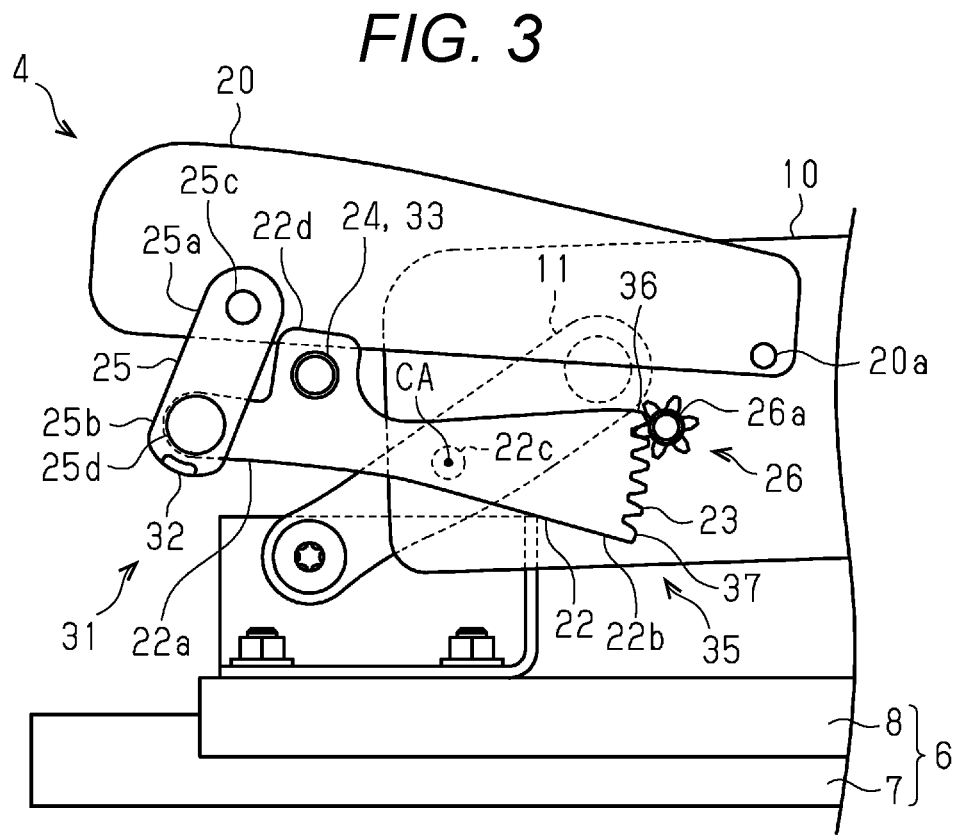
FIG. 3 is a side view of the tilting apparatus when the front portion of the lift frame is located at a position higher than the reference position.
Figure 4:
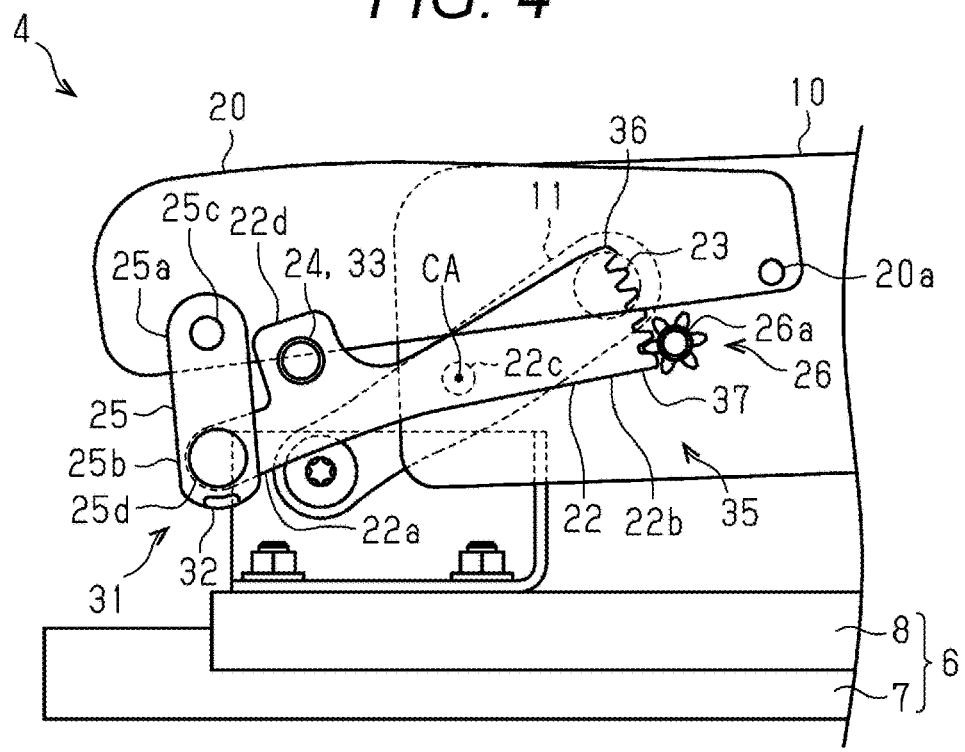
FIG. 4 is a side view of the tilting apparatus when the front portion of the lift frame is located at a position lower than the reference position.

Operation of the normal tilting apparatus 4 will be described with reference to FIGS. 2 to 4.

FIG. 2 is the side view of the tilting apparatus 4 when the front portion of the lift frame 20 is located at a reference position. The reference position is a position set in the vehicle seat 1 in advance. The reference position may be set by the user. When the front portion of the lift frame 20 is located at the reference position and the drive gear 26a is rotated counterclockwise by the user's operation, the front portion 22a of the link member 22 is raised, and the front portion of the lift frame 20 is raised as shown in FIG. 3. When the drive gear 26a keeps rotating and the drive gear 26a contacts the upper stopper 36 provided in the sector gear 23 of the link member 22, the rotation of the drive gear 26a is limited by the upper stopper 36, so that rise of the front portion 22a of the link member 22 stops at an upper limit position (see FIG. 3).

When the front portion of the lift frame 20 is located at the reference position and the drive gear 26a is rotated clockwise by the user's operation, the front portion 22a of the link member 22 is lowered, and the front portion of the lift frame 20 is lowered. When the drive gear 26a keeps rotating and the drive gear 26a contacts the lower stopper 37 provided in the sector gear 23 of the link member 22, the rotation of the drive gear 26a is limited by the lower stopper 37, so that lowering of the front portion 22a of the link member 22 stops at a lower limit position (see FIG. 4).

Figure 5:
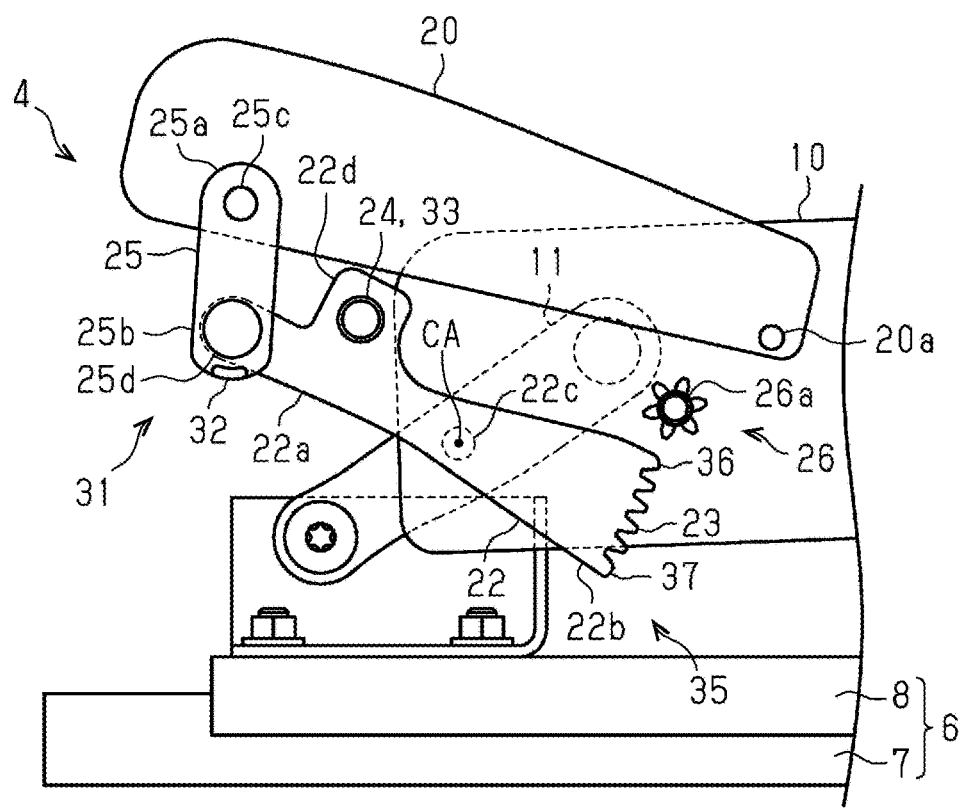
FIG. 5 is a side view of the tilting apparatus when the front portion of the lift frame is raised and rotation of the lift frame is limited by a front limiter.
Figure 6:
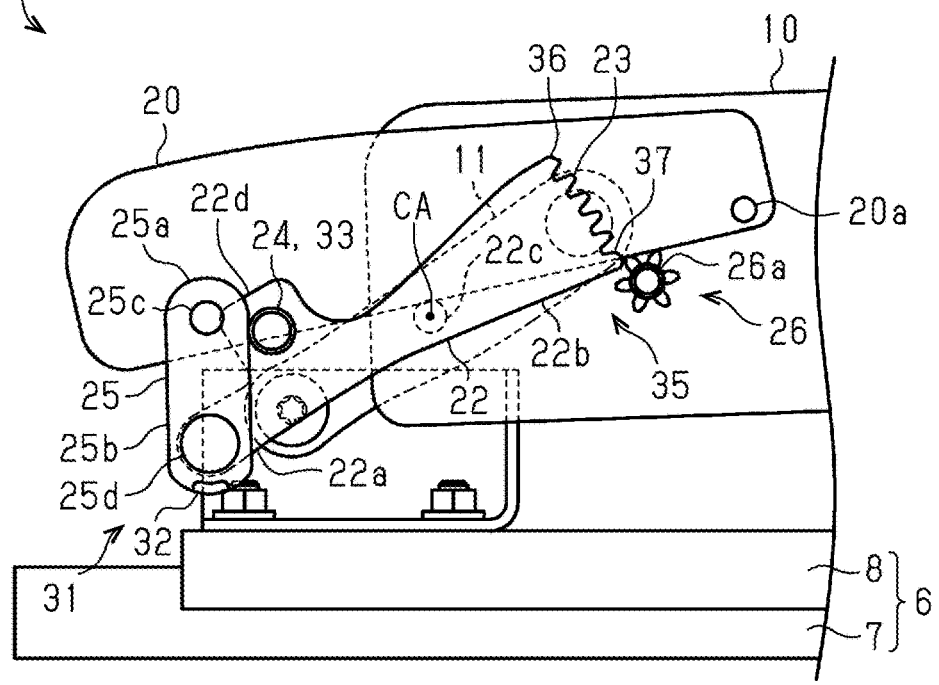
FIG. 6 is a side view of the tilting apparatus when the front portion of the lift frame is lowered and the rotation of the lift frame is limited by the front limiter.

The operation of the tilting apparatus 4 when the rotation limit of the link member 22 by the rear limiter 35 is removed will be described with reference to FIGS. 5 and 6. For example, when an upper end or a lower end of the sector gear 23 of the link member 22 is deformed due to the vehicle collision or the like, the rotation limit of the link member 22 by the rear limiter 35 may be removed. For example, the upper stopper 36 may not be engaged with the drive gear 26a by the deformation of the sector gear 23 due to the vehicle collision or the like. In this case, as shown in FIG. 5, the front portion 22a of the link member 22 is further raised beyond the upper limit position set by the rear limiter 35. In this case, as shown in FIG. 5, the rotation of the link member 22 is limited by the first contact portion 32 of the front limiter 31. Thus, the front portion 22a of the link member 22 stops at a position slightly higher than the upper limit position set by the rear limiter 35. In this way, the rise of the front portion 22a of the link member 22 is limited. The lower stopper 37 may not be engaged with the drive gear 26a by the deformation of the sector gear 23 due to the vehicle collision or the like. In this case, as shown in FIG. 6, the front portion 22a of the link member 22 is further lowered than the lower limit position set by the rear limiter 35. In this case, as shown in FIG. 6, the rotation of the link member 22 is limited by the second contact portion 33 of the front limiter 31. Thus, the front portion 22a of the link member 22 stops at a position slightly lower than the lower limit position set by the rear limiter 35. In this way, the lowering of the front portion 22a of the link member 22 is limited.

Operation of the present embodiment will be described.

The rotation of the link member 22 of the tilting apparatus 4 is limited by the rear limiter 35 at the rear portion of the link member 22 so that the rotation range of the link member 22 is within the predetermined range. In addition, the rotation of the link member 22 of the tilting apparatus 4 is limited by the front limiter 31 at the front portion of the link member 22 so that the rotation range of the link member 22 is within the predetermined range. In this way, the rotation of the link member 22 is limited by the limiters. Thus, even if one of the limiters does not function, the rotation of the link member 22 can be limited by the other limiter.

Effects of the present embodiment will be described.

(1) The front portion 22a in front of the rotation center of the link member 22 of the tilting apparatus 4 is provided with the front limiter 31 for limiting the rotation of the link member 22. The rear portion 22b behind the rotation center of the link member 22 of the tilting apparatus 4 is provided with the rear limiter 35 for limiting the rotation of the link member 22. With this configuration, the rotation of the link member 22 is limited by the front limiter 31 and the rear limiter 35. In this way, the two limiters are provided, so that the rotation limit of the link member is suppressed from being completely removed. Thus, it is possible to suppress the rotation limit of the lift frame 20 that is a part of the vehicle seat 1 from being removed upon the vehicle collision or the like.

(2) The tilting apparatus 4 includes the connecting member 25. The connecting member 25 is rotatably connected to the link member 22. The front limiter 31 limits the rotation angle of the connecting member 25 with respect to the link member 22. With this configuration, the rotation of the connecting member 25 with respect to the link member 22 is limited, so that the rotation of the link member 22 is limited.

With the configuration in which the rotation of the connecting member 25 with respect to the link member 22 is limited, it is also possible to obtain an effect of increasing the ease of attaching the connecting member 25 to the link member 22 in an assembly process when the connecting member 25 is attached thereto. Specifically, in the assembly process of the tilting apparatus 4, the connecting member 25 is attached to the link member 22, and then the connecting member 25 and the lift frame 20 are connected to each other. When the connecting member 25 is freely rotated with respect to the link member 22 and the connecting member 25 is attached to the link member 22, the upper portion 25a of the connecting member 25 hangs down and swings. Therefore, it is difficult to connect the connecting member 25 to the lift frame 20. In this regard, with the above configuration, the rotation of the connecting member 25 with respect to the link member 22 is limited. Therefore, the connecting member 25 is easily connected to the lift frame 20.

(3) The front limiter 31 includes the first contact portion 32 provided on at least one of the connecting member 25 and the link member 22. When the link member 22 is rotated to the predetermined angle in the direction in which the front portion 22a of the link member 22 is raised, the connecting member 25 and the link member 22 contact each other through the first contact portion 32. With this configuration, the structure of the first contact portion 32 of the front limiter 31 can be simplified.

(4) Preferably, the front limiter 31 includes the second contact portion 33 provided on at least one of the connecting member 25 and the link member 22. When the link member 22 is rotated to the predetermined angle in the direction in which the front portion 22a of the link member 22 is lowered, the connecting member 25 and the link member 22 contact each other through the second contact portion 33. With this configuration, the structure of the second contact portion 33 of the front limiter 31 can be simplified.

(5) In the present embodiment, the link members 22 are arranged apart from each other in the vehicle width direction and are connected to each other with the connecting shaft 24. The second contact portion 33 is constituted by the connecting shaft 24. With this configuration, the connecting shaft 24 has the function of the second contact portion 33. Therefore, the structure of the tilting apparatus 4 can be simplified.

Other Embodiments

The above embodiment is not limited to the above configuration example. The above embodiment can be modified as follows. In the following modifications, components that are substantially unchanged from the components of the above embodiment will be described with the same reference numerals as those of the above embodiment.

The structure of the front limiter 31 and the rear limiter 35 is not limited to the example of the embodiment. Each of the front limiter 31 and the rear limiter 35 may be configured to include a guide provided in the link member 22 and a projection that engages with the guide. The guide is configured as an arc-shaped groove along a circle centered on the rotation center of the link member 22. The rotation range of the link member 22 is set depending on the length of the arc-shaped guide.

Figure 7:
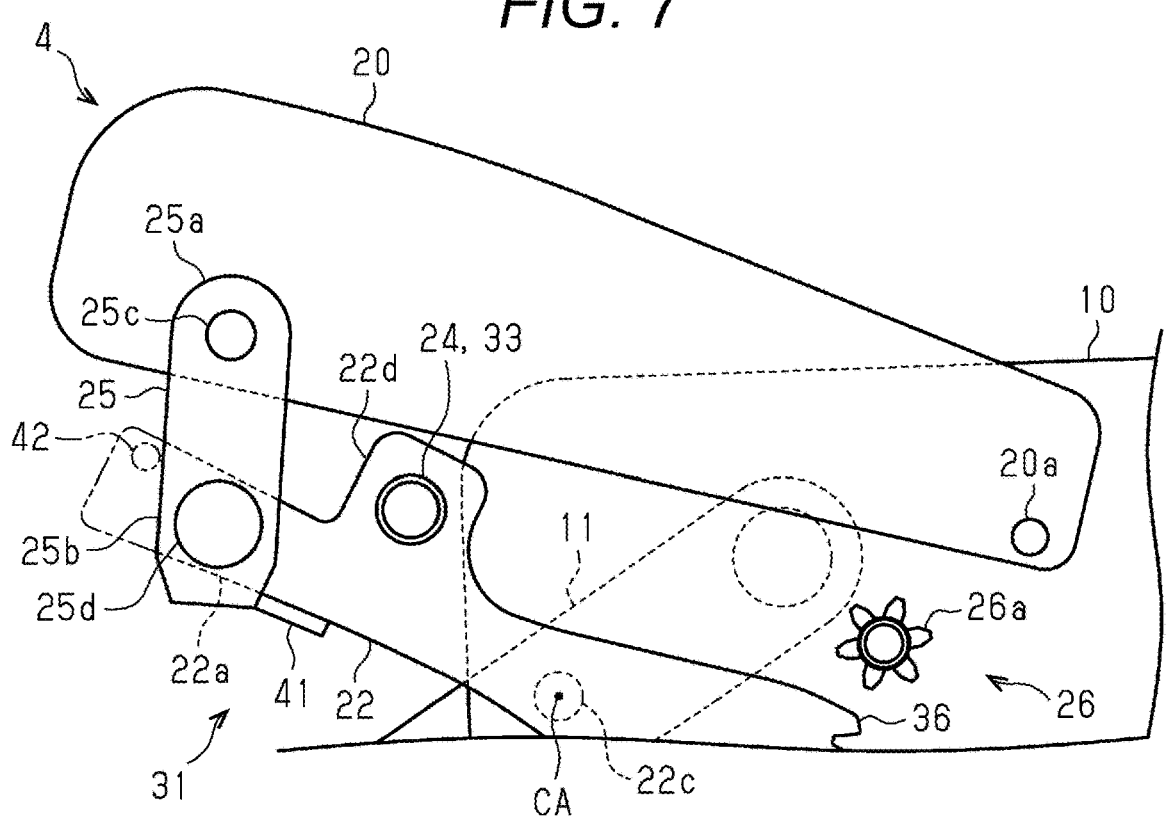
FIG. 7 is a side view of the tilting apparatus including modification of the front limiter.

FIG. 7 shows a first modification of the front limiter 31 by a solid line. As shown in FIG. 7, the front limiter 31 may be configured as a third contact portion 41 provided on the link member 22. The third contact portion 41 is configured as a projection provided at a lower end of the link member 22. The third contact portion 41 is configured such that when the link member 22 is rotated to the predetermined angle in the direction in which the front portion 22a of the link member 22 is raised, the connecting member 25 and the link member 22 contact each other through the third contact portion 41.

FIG. 7 shows a second modification of the front limiter 31 by a two-dot chain line. As shown in FIG. 7, the front limiter 31 may be configured as a fourth contact portion 42 provided at a front end of the link member 22. The fourth contact portion 42 is configured as a projection provided at the front end of the link member 22. The front end of the link member 22 is disposed in front of the connecting member 25. The fourth contact portion 42 is configured such that when the link member 22 is rotated to the predetermined angle in the direction in which the front portion 22a of the link member 22 is raised, the connecting member 25 and the link member 22 contact each other through the fourth contact portion 42.

In the present embodiment, the front limiter 31 is disposed on the link member 22 of the tilting apparatus 4. Instead of this, the front limiter 31 may be disposed on a constituting part of the seat lifting apparatus 5. In the present embodiment, the rear limiter 35 is disposed on the sector gear 23 provided on the link member 22 of the tilting apparatus 4. Instead of this, the rear limiter 35 may be disposed on a constituting part of the seat lifting apparatus 5.

In the present embodiment, the link member 22 is rotated by the power of the drive mechanism 26 including the electric motor. In this regard, the drive mechanism 26 may have a structure that is manually operated. In one example, the drive gear 26a of the drive mechanism 26 is connected to a lever that is rotated by human power.

In the present embodiment, the rear link 12 is rotated by the power of the drive mechanism 14 including the electric motor. In this regard, the drive mechanism 14 may have a structure that is manually operated. In one example, the drive gear 14a of the drive mechanism 14 is connected to a lever that is rotated by human power.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A vehicle seat lifting apparatus, comprising:
   a cushion base of a vehicle seat;
   a link member rotatably provided on the cushion base and configured to raise and lower at least a part of the vehicle seat as the link member rotates;
   a front limiter provided in front of a rotation center of the link member in a front-rear direction of the vehicle and configured to limit rotation of the link member;
   a rear limiter provided behind the rotation center of the link member in the front-rear direction of the vehicle and configured to limit the rotation of the link member; and
   a connecting member rotatably connected to the link member in one end thereof and rotatably connected to the part of the vehicle seat in another end thereof, wherein
   the front limiter is configured to limit a rotation angle of the connecting member with respect to the link member,
   the front limiter includes a first contact portion provided on at least one of the connecting member and the link member, and
   when the link member is rotated to a predetermined angle in a direction in which a front portion of the link member is raised, the connecting member and the link member contact each other through the first contact portion.

2. The vehicle seat lifting apparatus according to claim 1, wherein the front limiter includes a second contact portion provided on at least one of the connecting member and the link member, and when the link member is rotated to a predetermined angle in a direction in which the front portion of the link member is lowered, the connecting member and the link member contact each other through the second contact portion.

3. The vehicle seat lifting apparatus according to claim 2, wherein
   the link member includes a plurality of link members, and the plurality of the link members are arranged apart from each other in a vehicle width direction and are connected to each other with a connecting shaft, and
   the second contact portion is constituted by the connecting shaft.

* * * * *